(12) United States Patent
Harrison

(10) Patent No.: US 6,240,302 B1
(45) Date of Patent: *May 29, 2001

(54) WIRELESS PHONE WITH REMOVABLE PERSONAL INFORMATION MANAGER

(75) Inventor: Dana C. Harrison, Sandy, UT (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,557

(22) Filed: May 29, 1998

(51) Int. Cl.[7] .................................................. H04Q 7/20
(52) U.S. Cl. .......................... 455/556; 455/557; 455/558
(58) Field of Search ............................ 455/90, 550, 566, 455/575, 556, 557, 558

(56) References Cited

U.S. PATENT DOCUMENTS

| | | | | |
|---|---|---|---|---|
| 5,343,319 | * | 8/1994 | Moore | 359/152 |
| 5,566,226 | * | 10/1996 | Mitziguchi et al. | 455/558 |
| 5,594,952 | * | 1/1997 | Virtuoso et al. | 455/89 |
| 5,764,899 | * | 6/1998 | Eggleston et al. | 395/200.33 |
| 5,845,217 | * | 12/1998 | Lindell et al. | 455/557 |
| 5,884,190 | * | 3/1999 | Lintula et al. | 455/557 |
| 5,903,851 | * | 5/1999 | Backstrom et al. | 455/557 |
| 5,907,815 | * | 5/1999 | Grimm et al. | 455/557 |
| 5,913,174 | * | 6/1999 | Casarez et al. | 455/557 |
| 5,920,460 | * | 7/1999 | Oldendorf et al. | 361/753 |
| 5,924,044 | * | 7/1999 | Vannatta et al. | 455/556 |
| 5,933,785 | * | 8/1999 | Tayloe | 455/558 |
| 5,956,651 | * | 9/1999 | Willkie et al. | 455/553 |
| 6,047,196 | * | 4/2000 | Makela et al. | 455/556 |
| 6,088,730 | * | 7/2000 | Kato et al. | 709/227 |

* cited by examiner

Primary Examiner—William G. Trost
Assistant Examiner—Congvan Tran
(74) Attorney, Agent, or Firm—Workman, Nydegger & Seeley

(57) ABSTRACT

A communications system includes a wireless telephone having a PC card rotatably and electrically coupled therewith. The PC card has a Type Two form factor. The system further includes a discrete, independently operably PIM. The PIM comprises a housing having a display screen mounted thereon and encloses electronic circuitry. The housing bounds a card slot. The card slot is configured to removably receive the PC card such that the wireless telephone is electrically coupled with the PIM when the PC card is received within the card slot.

13 Claims, 3 Drawing Sheets

WIRELESS PHONE WITH REMOVABLE PERSONAL INFORMATION MANAGER

BACKGROUND OF THE INVENTION

1. The Field of the Invention

The present invention relates to wireless telephones and more specifically, wireless telephones operable with personal information managers.

2. Present State of the Art

Cellular or wireless telephones are becoming increasing more popular. As the work force becomes more mobile and less office-spaced centered, the need for wireless telephones and associated services becomes more indispensable. Although wireless telephones have become significantly smaller and less expensive, there are still several shortcoming associated with conventional wireless telephones. For example, some wireless telephones are now configured to receive paging or e-mail messages. Unfortunately, as the size of the telephone has decreased, so has the display screen thereon. Accordingly, it is often difficult to view and read messages of any significant length.

Furthermore, although wireless telephones are capable of storing a select number of manually input phone numbers, wireless telephones are severely limited in their ability to function as information managers. That is, wireless telephones which have a particularly small display screen, are not configured to manage and sort daily schedules, yearly calendar events, addresses, or business cards. In addition, conventional wireless telephones are not practical as information managers since it is often desired to receive or record information in an information manager while one is talking on the telephone.

To effectively manage information, personal information managers (hereinafter "PIMs") have been developed. PIMs are small, substantially hand-sized computers that are used for storing, manipulating, and retrieving a defined amount of data. One example of a PIM is the PalmPilot® manufactured by 3Com. The PalmPilot® functions primarily as an electronic day planner and address recorder. PIMs have a relatively large screen and thus are useful in imputing, sorting, and retrieving data. Nevertheless, they also have their limitations. For example, although PIMs can be coupled with a host computer for downloading or transferring files therebetween, PIMs are not designed to independently receive or display paging or e-mail messages. Furthermore, PIMs are not designed for interacting with wireless telephones.

OBJECTS AND BRIEF SUMMARY OF THE INVENTION

Accordingly, it is an object of the present invention to provide improved wireless telephones that are operable with a PIM.

Another object of the present invention is to provide improved wireless telephones wherein the PIM can be integrally coupled therewith and has a relatively large screen for receiving and displaying paging messages and e-mail messages from the wireless telephone.

Another object of the present invention is to provide wireless telephones wherein the PIM can be selectively removed and used independently from the wireless telephone.

Finally, another object of the present invention is to provide wireless telephones as above which can be selectively coupled with a laptop computer for facilitating wireless communication therewith.

To achieve the foregoing objects, and in accordance with the invention as embodied and broadly described herein, a communications system is provided which includes a wireless telephone that is removably coupled with a PIM. Specifically, the present invention comprises a conventional wireless telephone having a PC card rotatable attached thereto. The PC card is electrically coupled with the wireless telephone and has a Type Two form factor.

The PIM is independently operable and comprises a housing having a screen mounted thereon and encloses electronic circuitry. Such circuitry includes a central processing unit and memory. Also disposed within the PIM is a battery for energizing. The housing bounds a card slot which communicates to the exterior through an opening. The card slot is configured to removably receive the PC card such that the wireless telephone is electrically coupled with the PIM when the PC card is received within the card slot.

The present invention has several advantages over prior art systems. For example, when messages, such as paging or e-mail messages, are received by the wireless telephone, the messages can be displayed on the large screen of the PIM. Likewise, the wireless telephone can be used for accessing and downloading information to or uploading information from the PIM. Furthermore, the PIM can be used for selecting and automatically dialing telephone numbers on the wireless telephone. Furthermore, when it is desired to record or take notes during a telephone conversation, the PIM can be removed from the wireless telephone and used independently therefrom.

The PC card of the inventive wireless telephone can also be inserted directly within a conventional card slot on a laptop or other computer for facilitating wireless communication with the computer.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
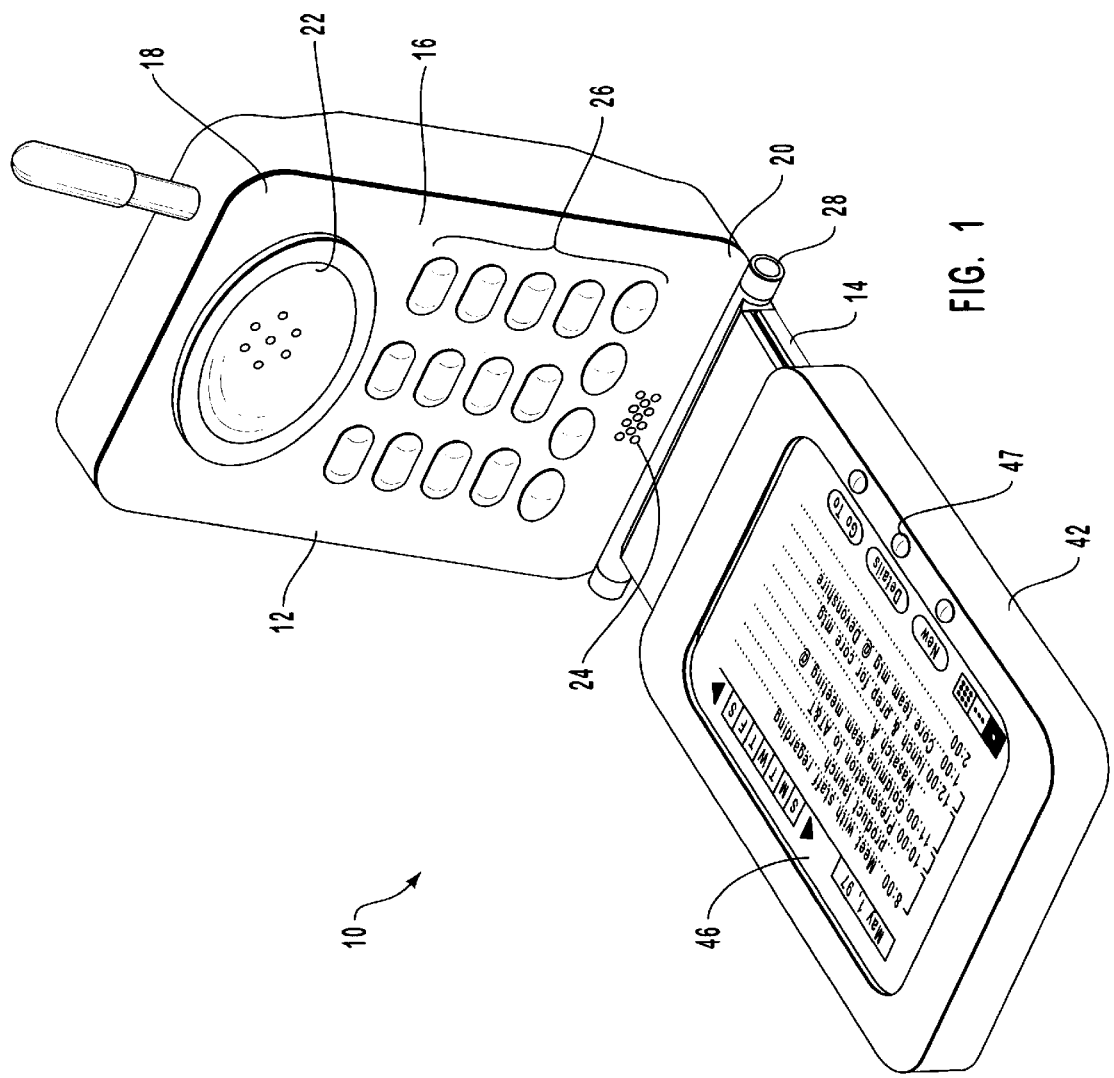
FIG. 1 is a perspective view of a wireless telephone having a PC card attached thereto for coupling with a PIM.

Depicted in FIG. 1 is one embodiment of an inventive communication system 10 incorporating features of the present invention. Communication system 10 comprises a conventional wireless telephone 12 rotatably attached to a PC card 14. Telephone 12 can comprise virtually any type of cellular or wireless telephone and can be either analog or digital. Wireless telephone 12 is depicted as having a front face 16 extending from a top end 18 to a bottom end 20. Mounted on front face 16 is a speaker 22, a microphone 24, and plurality of push buttons 26. In an alternative embodiment, a display screen can also be mounted on front face 16.

Mounted to bottom end 20 of telephone 12 is a hinge 28. PC card 14 is attached to hinge 28 such that PC card 14 and telephone 12 can be selectively folded together when not in use or spread apart during use. As used in the specification and appended claims, the term "PC card" is broadly intended to include conventional computer cards such as PCMCIA cards having a variety of different form factors and computer cards that are designed under new standards or form factors. One preferred example of a PC card 14 is a PCMCIA card having a Type Two form factor.

Figure 2:
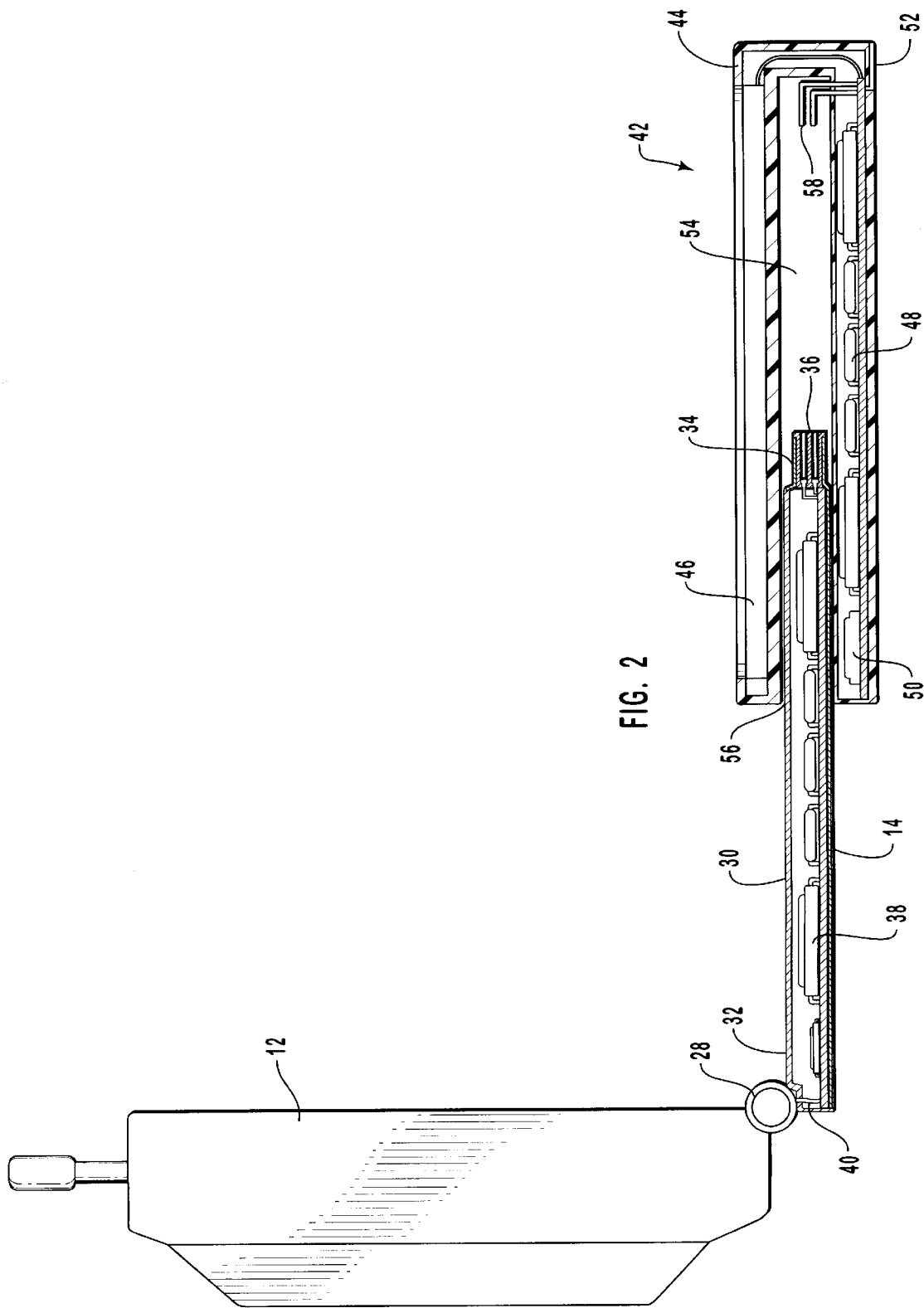
FIG. 2 is a partial cross-sectional side view of the communications system shown in FIG. 1.

As depicted in FIGS. 1 and 2, PC card 14 has a substantially box shaped housing 30 extending from a first end 32 attached to hinge 28 to an opposing free second end 34. Positioned at second end 34 is an electrical socket 36. Electrical socket 36 can comprise any of a variety of different electrical couplers such as conventional multi pin ports. Disposed within housing 30 is electrical circuitry 38. Electrical circuitry 38 can comprise any of the circuitry commonly used in conventional PC cards. For example, electrical circuitry 38 can comprise memory, a central processing unit, and/or modem circuitry. Electrical circuitry 38 is coupled with telephone 12 through wiring 40 extending through hinge 28. In alternative embodiments, it is also envisioned that housing 30 can be void of electrical circuitry other than wiring 40 extending from socket 36 to telephone 12. In this embodiment, PC card 14 functions simply as an electrical socket.

As also depicted in FIGS. 1 and 2, communication system 10 further includes a personal information manager ("PIM") 42. PIM 42 comprises substantially the same elements as conventional PIMs also referred to as personal data assistance ("PDA"). One example of a PIM is the PalmPilot® manufactured by 3Com. The PalmPilot® functions primarily as an electronic day planner and address recorder. The present invention envisions, however, that PIM 42 will be slightly smaller than conventional PIMs so that PIM 42 can be attached to telephone 12 and still stored within a person's pocket.

In the embodiment depicted, PIM 42 comprises a housing 44 having a screen 46 mounted thereon and enclosing electrical circuitry 48. Electrical circuitry 48 is substantially the same as that found in conventional PIM's. For example, electrical circuitry can include a central processing unit and memory. During operation, the central processing unit interacts with an operating system that runs selective software depending on the intended use of PIM 42. PIM 42 is energized by batteries 50 removably disposed within housing 44. Electrical contacts 52 disposed on the exterior of housing 44 enable charging of batteries 50. Contacts 52 also enable PIM 42 to be electrically coupled with a computer for transferring data therebetween.

Disposed within housing 44 is a card slot 54 that communicates with the exterior through an opening 56. Card slot 54 is configured to slidably receive PC card 14. Disposed within card slot 54 is a plug 58 electrically coupled with PIM 42. Plug 58 is configured to mate with socket 36 to effect an electrical coupling between PIM 42 and PC card 14, thereby also effecting an electrical coupling between PIM 42 and telephone 12. In one embodiment, plug 58 can comprise a plurality of pins.

In on embodiment of the present invention, means are provided for integrally coupling wireless telephone 12 with PIM 42 so as to electrically connect PIM 42 to wireless telephone 12. One embodiment of the means for integrally coupling comprises PC card 14 attached to telephone 12 and card slot 54 being configured to receive PC card 14. In alternative embodiments, PC card 14 and card slot 54 can be replaced with an electrical socket attached to telephone 12 that is configured to mate with a corresponding electrical plug on PIM 42. The present invention envisions that there are a variety of alternative mechanical and electrical couples that can be used to secure telephone 12 together with PIM 42.

The present invention also envisions that PC card 42 need not be rotatably attached to telephone 12. PC card 42 can be rigidly attached to telephone 12 and even partially recessed within telephone 12.

PIM 42 can be used independent of telephone 12 in substantially the same way that conventional PIMs are used. For example, PIM 42 can be loaded with software for recording and sorting the types of information found in convention day planners. Such information can include dates, calendars, addresses, phone numbers, and project lists. Of course, PIM 42 can also be loaded with software for recording and sorting any type of data desired. The data can be manually input into PIM 42 using a special pen to scribe letters onto screen 46 or by selecting letters or numbers displayed on screen 46. This is the same type of technology used in the PalmPilot®. Buttons 47 positioned on housing 44 can be used for selecting programs or data and for inputting data.

It is envisioned that PIM 42 can be loaded with select software and electric circuitry for producing a variety of unique functions when coupled with PC card 14. For example, e-mail and paging messages received by telephone 12 can be transferred and displayed on screen 46 of PIM 42. It is also envisioned that various data files such as addresses, telephone numbers, dates, or other data files, can be downloaded to or transmitted from PIM 42 through wireless telephone 12. In yet another embodiment, it is envisioned that telephone numbers stored on PIM 42 can be automatically dialed on telephone 12 by simply selecting the phone number on PIM 12.

One of the unique advantages of inventive communication system 10 is that when one is speaking on telephone 12, PIM 42 can be separated therefrom to enable the user to manually input data into PIM 42 during the telephone conversation.

Figure 3:
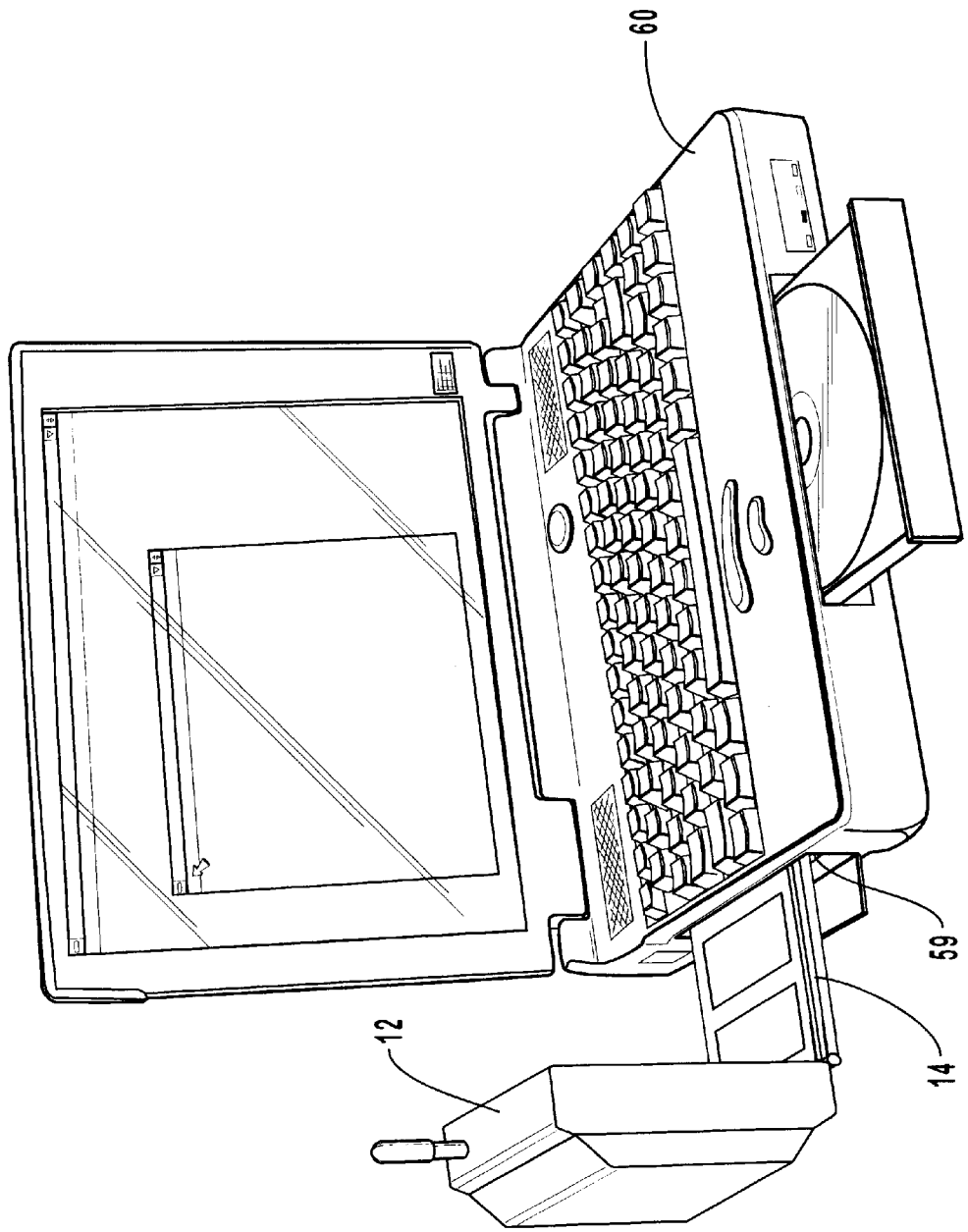
FIG. 3 is a perspective view of the PC card shown in FIG. 1 being selectively received within a card slot of a laptop computer.

As depicted in FIG. 3, the present invention also envisions that PC card 14 can be selectively received within a conventional card slot 59 of a standard laptop computer 60. In this design, telephone 12 can be used to provide remote wireless communication between computer 60 and another computer or electronic device. Where laptop computer 60 does not have a modem incorporated therein, PC card 14 can be configured having a modem incorporated therein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A communication system comprising:
   (a) a discrete, independently operable wireless telephone electrically and physically connected directly to a substantially rigid electronic card having a connector formed thereon; and
   (b) a discrete, independently operable handheld computing device, the handheld computing device comprising a housing having a screen mounted therein and enclosing electronic circuitry, the device further including a slot capable of operably receiving the connector formed on the card thereby physically and electrically coupling the wireless telephone directly to the handheld computing device in a manner such that the handheld computing device and the wireless telephone form a substantially integral handheld unit, the handheld computing device for storing and retrieving operational data for operation of the wireless telephone and for displaying receive data received by the wireless telephone.

2. A communication system as recited in claim 1, wherein the electronic card includes a printed circuit board with a central processing unit.

3. A communication system as recited in claim 1, wherein the wireless telephone is digital.

4. A communication system as recited in claim 1, wherein the handheld computing device is loaded with software for selectively transferring data between the handheld computing device and the wireless telephone.

5. A communication system comprising:
   (a) a wireless telephone;
   (b) a PC card having a connector conforming with the electrical and physical parameters of the PCMCIA standard and that is directly mounted to and electrically coupled with the wireless telephone; and
   (c) a discrete, independently operable handheld computing device, the handheld computing device comprising a housing having a screen mounted thereon and enclosing electronic circuitry, the housing including a card slot configured to removably receive at least a portion of the PC card such that the wireless telephone is electrically coupled with the handheld computing device when the PC card is received within the card slot, the handheld computing device for storing and retrieving operational data for operation of the wireless telephone and for displaying receive data received by the wireless telephone.

6. A communication system as recited in claim 5, wherein the PC card has a Type Two form factor.

7. A communication system as recited in claim 5, wherein the PC card is rotatably mounted to the wireless telephone.

8. A communication system as recited in claim 5, wherein the PC card houses a modem.

9. A communication system as recited in claim 5, wherein the handheld computing device is configured to receive signals from the wireless telephone and display them on the screen thereof.

10. A communication system comprising:
    (a) a wireless telephone;
    (b) a PC card that is directly connected to the wireless telephone in a manner so as to be at least partially ratable with respect to the telephone; and
    (a) a discrete, independently operable handheld computing device, the handheld computing device comprising a housing having a screen mounted therein and enclosing electronic circuitry, the housing including a card slot configured to removably receive at least a portion of the PC card such that the wireless telephone is electrically coupled with the handheld computing device when the PC card is received within the card slot, the handheld computing device for storing and retrieving operation of the wireless telephone and for display receive data received by the wireless telephone.

11. A communication system as recited in claim 10, wherein the PC card complies with the physical parameters prescribed by the PCMCIA.

12. A communication system as recited in claim 10, wherein the PC card and the handheld computing device each have an independent central processing unit.

13. A communication system as recited in claim 10, wherein the handheld computing device has electrical contacts mounted on the outside thereof.

* * * * *